Feb. 8, 1927.
G. S. JAXON
1,617,117
COAL HANDLING PLANT
Filed Dec. 7, 1925     4 Sheets-Sheet 4
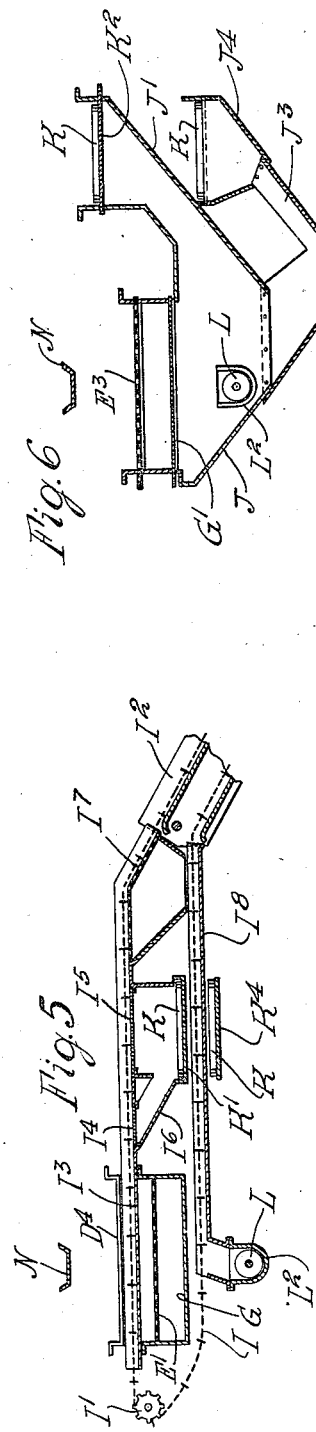
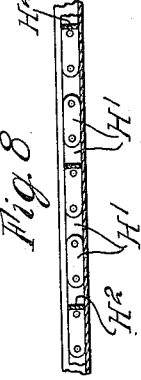
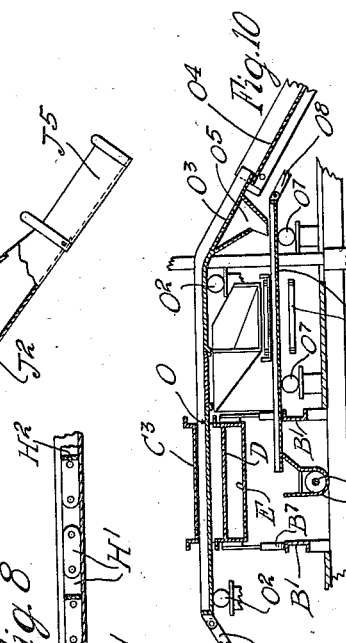
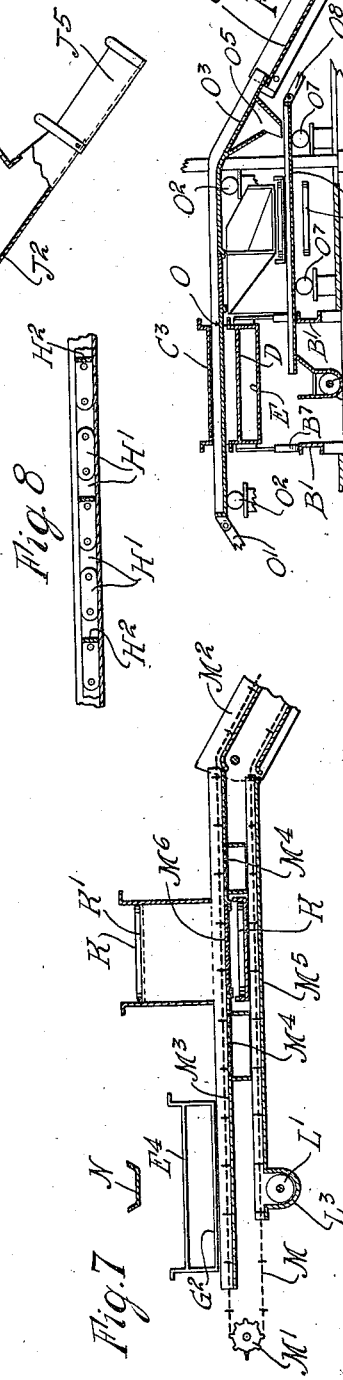
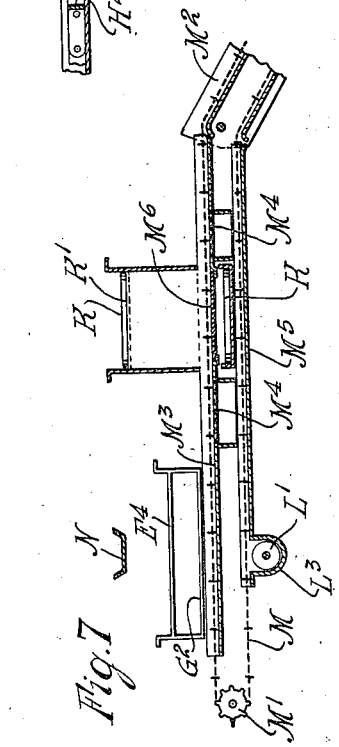
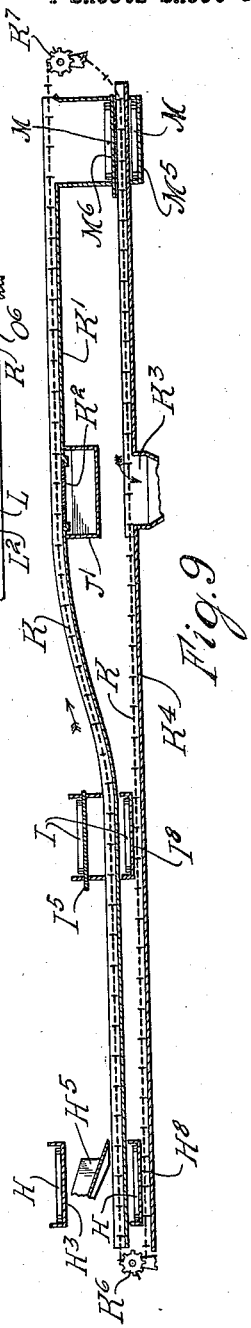
Inventor
George S. Jaxon
by Parker & Carter
Attorneys Patented Feb. 8, 1927.

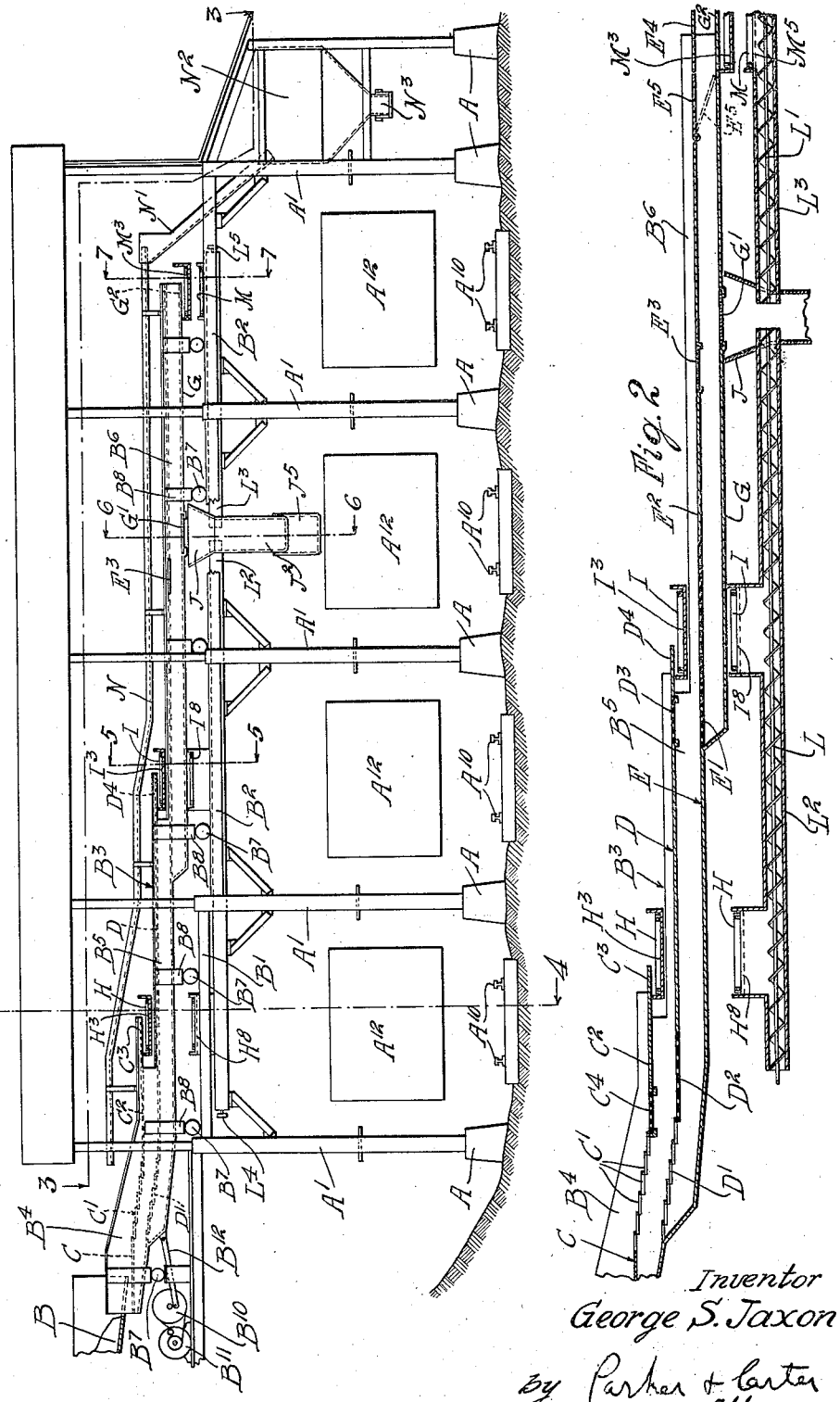

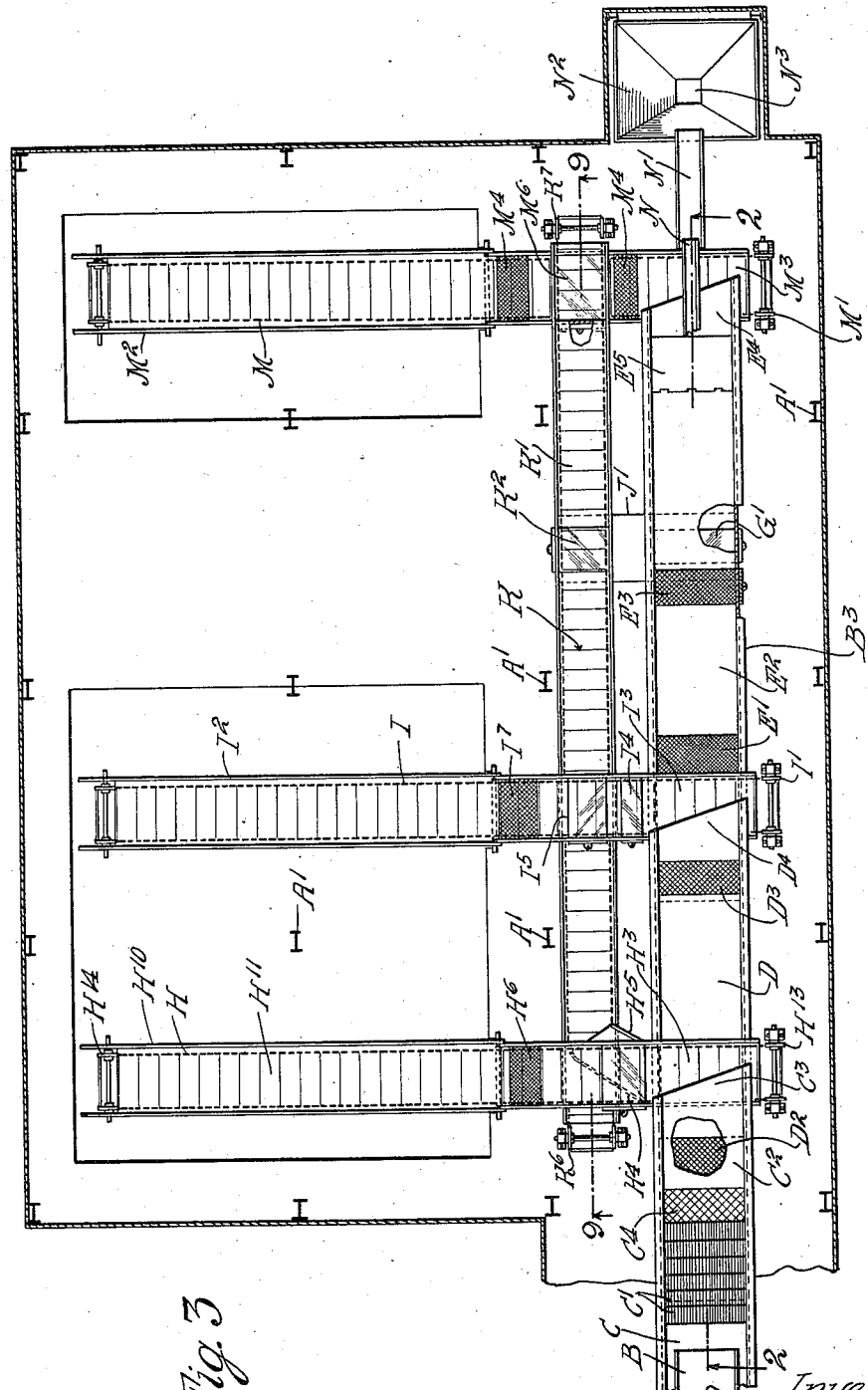

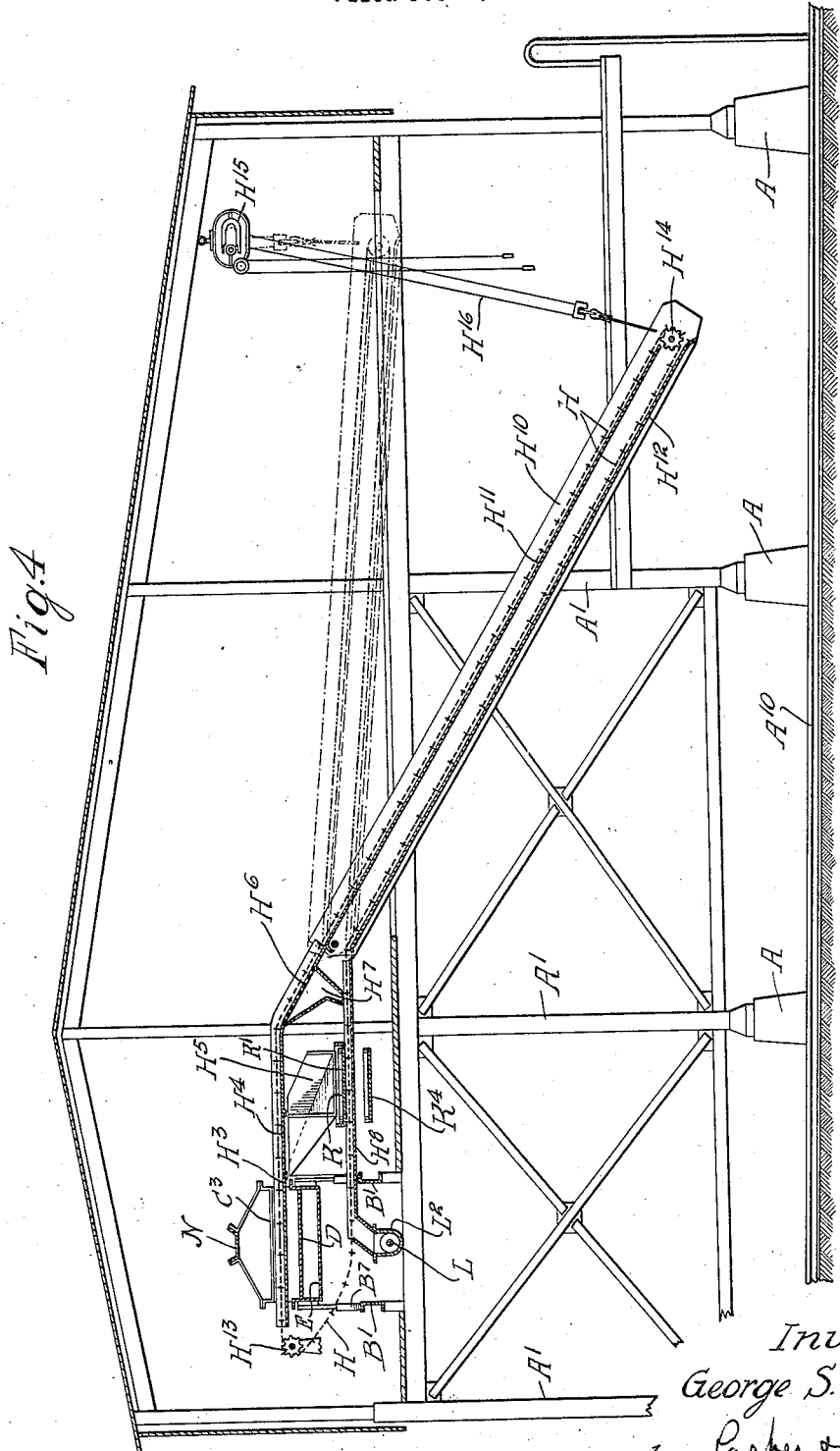

1,617,117

UNITED STATES PATENT OFFICE.

GEORGE S. JAXON, OF HUNTINGTON, WEST VIRGINIA, ASSIGNOR TO LINK-BELT COMPANY, OF CHICAGO, ILLINOIS, A CORPORATION OF ILLINOIS.

COAL-HANDLING PLANT.

Application filed December 7, 1925. Serial No. 73,588.

My invention relates to an improvement in screenings and relates particularly to horizontal or generally horizontal screens or screening assemblies for screening or grading coal or other materials. One object is a provision of a screen whereby coal or similar materials may be screened, graded and conveyed for storage or shipment with a minimum shock or breakage. Other objects will appear from time to time in the course of my specification and claims.

I illustrate my invention more or less diagrammatically in the accompanying drawings, wherein—

Figure 1 is a side elevation;

Figure 2 is an enlarged section on the line 2—2 of Figure 3;

Figure 3 is a section on the line 3—3 of Figure 1;

Figure 4 is an enlarged section on the line 4—4 of Figure 1;

Figure 5 is an enlarged section on the line 5—5 of Figure 1;

Figure 6 is an enlarged section on the line 6—6 of Figure 1;

Figure 7 is an enlarged section on the line 7—7 of Figure 1;

Figure 8 is an enlarged longitudinal section along an endless conveyor;

Figure 9 is an enlarged section on the line 9—9 of Figure 3; and

Figure 10 is a section similar to Figure 4 through a modified form.

Like parts are indicated by like symbols throughout the specification and drawings.

Referring initially to Figures 1 and 2, A A are any suitable foundation members upon which are erected the frame members $A^1$ $A^1$ upon which the below described screening and conveying mechanisms are mounted. Between the vertical frame members $A^1$ $A^1$ are spaced a plurality of tracks $A^{10}$ $A^{10}$ upon which are supported any suitable conveying members $A^{12}$.

B indicates a delivery chute or spout or any suitable means for delivering the coal or other material to the screening mechanism. $B^1$ $B^2$ are horizontal track members upon which is supported the horizontal screen structure generally denominated as $B^3$ which consists of the inclined member $B^4$ the intermediate horizontal member $B^5$ and the lower horizontal member $B^6$. $B^7$ are rollers or other suitable bearing members interposed between the tracks $B^1$ $B^2$ and the screen member $B^3$ for example by the intermediary of the upper track members or roller engaging members $B^8$. $B^{10}$ is any suitable means herein shown as an eccentric for imparting an irregular reciprocatory movement to the screen structure. $B^{11}$ is any suitable motor or driving means and $B^{12}$ is a link whereby the movement of the eccentric is transmitted to the screen. It will be understood that in order to effect a feeding movement along the horizontal screen it is moved relatively slowly in the desired direction of conveyance and is withdrawn sharply in the opposite direction.

C is an upper material receiving member provided with the screening section $C^1$ and terminating with the plane plate $C^2$ provided with an overhanging inclined edged lip $C^3$ which overhangs a conveyor or boom later to be described. The plate $C^2$ may be provided with a removable screening section $C^4$, upon the removal of which all the coal passing over the screen $C^1$ may be delivered to the plate D.

D is a second generally horizontal conveying plate at a lower level than the plate sections C and $C^2$. It is provided with the screen section $D^1$ and the perforate screen sections $D^2$ $D^3$ and in turn terminates in an inclined edged overhanging section $D^4$. The screening section $D^3$ is illustrated as forming a removable gate member, when it is desired to discharge the material conveyed along the member D in its entirety to the screen $E^1$ and thus eventually to the boom M.

E is a conveying plate which also serves as bottom of the screen structure and underlies the screen sections $C^1$ $D^1$ and $D^2$. Continuing on a level with it is the perforated screen section $E^1$ communicating with the plane conveying section $E^2$ which in turn is broken by a screening section or perforated slide, gate or plate, $E^3$, and terminates in an overhanging inclined edged discharge section $E^4$. $E^5$ is a hinged go-down plate adapted to communicate with the discharge member $E^4$ or to be dropped into the position shown in dotted lines in Figure 2.

G is a lower plane conveying plate which also serves as part of the bottom of the screen structure. It underlies the screen sections E¹ E³ and the conveying sections E². It is provided with a removable gate G¹ and terminates in the inclined edged overhanging discharge member G².

Referring more particularly to Figures 3 and 4 H generally indicates an endless conveyor belt the details of which are shown in Figure 8. It may consist of a pair of laterally spaced chains H¹ H¹ connected by cross flights or scrapers H². H³ is any plane surfaced supporting member for the support of such chain, which is positioned beneath the outwardly projecting discharge member C³ of the screening member C. It is provided with a gate H⁴ adapted to communicate with a chute H⁵ which in turn is adapted to deposit the material downwardly directed therealong to the endless mixing conveyor K. H⁶ is a rescreen section at one end of the horizontal section H³, and downwardly inclined in relation thereto. It communicates with a chute H⁷ which delivers the material passing through the screen H⁶ to the lower stretch of the endless conveyor H which serves to convey it to the left, as shown in Figure 4 along the conveying plate H⁸ to the screw conveyor L. Pivoted adjacent the rescreening member H⁶ is any suitable boom structure H¹⁰ provided with the plates H¹¹ H¹² along which extends the endless conveyor H. H¹³ is a drive sprocket for the endless conveyor H, the power source for which is not shown and forms no part of the present invention and H¹⁴ is a guide sprocket at the opposite end of the conveyor. H¹⁵ generally indicates any suitable housing mechanism for raising or lowering the boom H¹⁰ for example by means of the cable H¹⁶.

Referring more particularly to Figure 5 I illustrate an endless conveyor generally similar to the endless conveyor H and passing beneath the overhanging discharge section D⁴, and passing about the sprocket I¹ and extending about a boom I² generally similar to the boom H¹⁰. I³ is a supporting plate similar to the plane H³. It is provided with the gates I⁴ I⁵ one communicating with the chute I⁶ leading to the conveyor K and the other communicating directly with the space above the conveyor K. I⁷ is any suitable rescreen section adapted to communicate with the plate I⁸ and thus with the lower part of the endless conveyor I, whereby the material so discharged is conveyed to the left to the screw conveyor L.

Referring particularly to Figure 6 J is a discharge hopper underlying the gate G¹. Communicating with it is the hopper or chute section J¹ underlying the gate K² in the upper supporting plate K¹ of the endless conveyor K. J² is a chute extending downwardly from the hopper J and in communication with the subsidiary chute J³ and thus with the hopper J⁴ which underlies the break or aperture K³ in the lower supporting plate K⁴ of the endless conveyor K. J⁵ is any suitable terminal or discharge chute. It will be understood that the screw conveyors L and L¹ each discharge their material into the hopper J.

Referring more particularly to Figure 7 M is an endless conveyor generally similar to the conveyors H and I and passing about the sprocket M¹ and the loading boom M². M³ is an upper supporting plate therefor broken by the rescreen sections M⁴ whereby the material passes to the lower stretch of the endless conveyor and along the lower supporting plate M⁵ to the screw conveyor L¹. M⁶ is a gate communicating with the lower stretch of the endless mixing conveyor K. Whereas I have shown a screw conveyor, obviously other types of conveyor may be used for the same purpose.

Referring more particularly to Figure 9 the endless conveyor K passes over the upper supporting plate K¹ and the lower supporting plate K⁴. The upper supporting plate may be broken by the gate K² discharging to the chute J¹ and thus to the hopper J. The conveyor passes about the sprockets K⁶ K⁷ and is driven from any suitable source of power not herein shown.

Referring more particularly to the screw conveyors L and L¹ and having reference to Figures 1 and 2 they rotate respectively in the housings or drives L² L³ being rotated for example through the pulleys L⁴ L⁵ from any suitable power source or sources not herein shown. They are preferably rotated to discharge material from opposite sides into the hopper J. If desired the rescreen section M⁴ may be replaced by a solid section in order to permit run of mine to be shipped over the boom M.

N is any suitable refuse trough adapted to receive material picked from the various screen sections and reciprocating with the screen. It discharges into a terminal chute N¹ adapted to deliver material into the refuse bin N² whence it may be discharged for example through the spout N³.

Referring to Figure 10 I illustrate a modified form of boom similarly disposed to that shown in Figure 4. However in place of the endless conveyor H I provide an upper conveying section O adapted to be reciprocated for example through the link O¹ along the rollers O² in order to convey to the right as shown in Figure 10, the material discharged over the overhanging conveying section C³. O³ is the downwardly inclined rescreen section corresponding to the rescreen section H⁶ of Figure 4 and communicating with the pivoted loading boom O⁴ which is adapted to be reciprocated in unison with the conveyor O.

The chute O⁵ is adapted to deliver material to the conveying plate $o^6$ which is reciprocated along the rollers $O^7$ through the link $O^8$ to convey the material to the left as shown in Figure 10 to the screw conveyor L.

It will be realized that whereas I have illustrated a practical and operative device that nevertheless many changes might be made in the size, shape, number and disposition of parts without departing from the spirit of my invention and that I wish my drawings and description to be taken as in a broad sense illustrative and diagrammatic rather than as limiting me to my specific showing. For example, whereas I have illustrated an installation in which four tracks are employed, my invention is also applicable to installations of two or three tracks. I have illustrated both reciprocating and endless conveyor booms, but obviously any other suitable form of boom may be employed.

The use and operation of my invention are as follows:

The mixed material to be graded is discharged down the spout or the discharge means B. A particularly happy application for my invention is the screening of mixed or mine run coal. Such coal passes over the screening section $C^1$ which in the particular example of my invention herein shown may be sufficiently coarse to permit the passage of all but the light or lump coal. The lumps pass outwardly along the section $C^2$ and over the discharge section $C^3$ to the endless conveyor H. It will be noted that the large lumps are removed from the screen as fast as they are graded and therefore that they are not subjected to further dumping or degradation in the course of other screening and picking. The endless conveyor H passes the lump over the rescreen section $H^6$ the fines being further recovered and returned by the lower stretch of the conveyor H to the screw conveyor L. The lump so rescreened passes downwardly along the leading boom $H^{10}$, along a gradual slope until finally discharged into the conveyor $A^{12}$, with a minimum of dropping or breakage and consequent degradation. Picking may take place either along the screen conveying sections C $C^1$ and $C^2$ or along the endless conveyor H, or both, the picking length being thus considerably increased.

The next grade, for example egg, is passed through the screen $D^1$ $D^2$ and therefore passes to the right along the plate D, as shown in Figure 2. The finer grades pass through the screen to the lower deck E. The egg, or the second grade separated, whatever it may be, is further rescreened at the screen section $D^3$ just before it is discharged over the terminal section $D^4$ to the endless conveyor I. Like the lump it passes over the rescreen section $I^7$, the rescreenings being returned to the screw conveyor L along the plate $I^8$ as shown in Figure 5. The graded portion passes downwardly along the loading boom $I^2$ for final disposal.

It will be noted that the material conveyed by the endless conveyors to the loading booms passes over a gate $H^4$ in one case and over the gates $I^4$ $I^5$ in the other. When the e gates are open the material instead of passing on to the loading booms passes downwardly to the mixing conveyor K, as shown for example in Figure 9 and may pass to the right along such conveyor. It may then be discharged through the gate $K^2$ through the chutes $J^1$ $J^2$ and $J^5$ or it may pass over the right end of the plate $K^1$, as shown in Figure 9 for deposit upon the terminal endless conveyor or loading boom M. Thus by use of the mixing conveyor it is possible to direct one or both of the cleaned and picked lump and egg along such conveyor for delivery either down the chute $J^5$ or along the terminal loading boom $M^2$.

The finer grades of the material pass along the deck E across the screen sections $E^1$ $E^3$ and may be delivered to either of the terminals of the discharge sections $E^4$ or $G^2$ depending upon the position of the hinged gate or go-down plate $E^5$. The removal of the screen $E^3$ and the opening of the gate $G^1$ permits the discharge of all the finer material downwardly along the chute $J^2$ and thus through the chute or spout $J^5$.

Run of mine coal or all grades of any material so produced may be delivered down the chute $J^5$ when the screen $E^3$ and the gate $G^1$ are opened and when the egg and lump are being delivered to the mixing conveyor K and the gate $K^2$ is opened.

The fines may be conveyed along the screw conveyors $L^1$ $L^2$ either for discharge down the chute $J^5$ or upon reversal of the screw conveyors for any suitable disposition at the opposite ends of such conveyors.

When the screen gate $D^3$ is removed all the material passing over the surface D is delivered to the decks $E^2$ and G and thus to the boom M. The masking of the screening section $M^4$ permits the boom M to be employed to ship run of mine.

The refuse, picked from the material undergoing screening is deposited on the refuse conveyor N and passes thence down the chute $N^1$ to the refuse bin $N^2$.

It will be apparent from my description and drawings that I have developed a peculiarly flexible picking, screening and conveying system wherein there is a minimum of breakage and degradation, a maximum ease in picking, maximum length of picking steps and a very ready and flexible grading and removal of grades and subsequent recombination of grades when desired.

I claim:

1. In a picking and screening installation, a supporting structure, a screening conveyer member mounted upon said supporting structure and means for imparting to it a conveying reciprocation, a plurality of transversely disposed loading booms extending across the axis of movement of said conveyer member, a plurality of separate conveying and screening decks upon said conveyer member, said decks terminating in undercut discharge portions overhanging and discharging to said loading booms.

2. In a picking and screening installation, a supporting structure, a screening conveyer member mounted upon said supporting structure and means for imparting to it a conveying reciprocation, a plurality of transversely disposed loading booms extending across the axis of movement of said conveyer member, a plurality of separate conveying and screening decks upon said conveyer member, said decks terminating in undercut discharge portions overhanging and discharging to said loading booms, said decks increasing in effective length from top to bottom of the conveyer member, the loading booms being longitudinally spaced along said conveyer member.

3. In a picking and screening installation, a screening conveyer member and means for imparting a conveying movement thereto, a plurality of transversely disposed loading booms associated with said conveyer and overlying it, a plurality of undercut decks on said conveyer, said decks terminating in discharge portions overhanging and discharging to said loading booms.

4. In a picking and screening installation, a supporting structure, a screening conveyer member mounted upon said supporting structure and means for imparting to it a conveying reciprocation, a plurality of transversely disposed loading booms extending across the axis of movement of said conveyer member, a plurality of separate conveying and screening decks upon said conveyer member, said decks terminating in undercut discharge portions overhanging and discharging to said loading booms, said loading booms including endless conveyers.

5. In a picking and screening installation, a supporting structure, a screening conveyer member mounted upon said supporting structure and means for imparting to it a conveying reciprocation, a plurality of separate conveying and screening decks upon said conveyer member, said decks terminating in undercut discharge portions, a plurality of transversely disposed endless conveyers passing across said screening conveyer member and positioned beneath the discharge portions of said decks and adapted to receive material therefrom.

6. In a picking and screening installation, a screening conveyor member, a plurality of transversely disposed loading booms associated with said conveyor, a plurality of decks on said conveyor, said decks terminating in discharge portions overhanging and discharging to said loading booms, an endless mixing conveyor generally parallel with said screening conveyor and discharge means associated with said loading booms and adapted to discharge material to said mixing conveyor.

7. In a picking and screening installation, a screening conveyor member, a plurality of transversely disposed loading booms associated with said conveyor, a plurality of decks on said conveyor, said decks terminating in discharge portions overhanging and discharging to said loading booms, a mixing conveyor generally parallel with said screening conveyor and discharge means associated with said loading booms and adapted to permit the discharge material to said mixing conveyor.

8. In a picking and screening installation, a screening conveyor member, a plurality of transversely disposed loading booms associated with said conveyor, a plurality of decks on said conveyor, said decks terminating in discharge portions overhanging and discharging to said loading booms, a mixing conveyor generally parallel with said screening conveyor, discharge means associated with said loading booms and adapted to discharge material to said mixing conveyor and removable closures associated with said discharge means, whereby to avoid such discharge.

9. In a picking and screening installation, a supporting structure, a screening conveyer member mounted upon said supporting structure and means for imparting to it a conveying reciprocation, a plurality of separate conveying and screening decks upon said conveyer member, said decks terminating in undercut discharge portions, a plurality of transversely disposed longitudinally spaced secondary conveyers passing across the axis of movement of the screening conveyer member, and positioned beneath the discharge portions of said decks and adapted to receive material therefrom.

10. In a picking and screening installation, a primary screening conveyor member, a plurality of transversely disposed secondary conveyors associated with said primary conveyor, a plurality of decks on said primary conveyor, said decks terminating in discharge portions overhanging and discharging to said secondary conveyors, a mixing conveyor generally parallel with said screening conveyor and discharging means associated with said secondary conveyors and adapted to permit the discharge of material from said secondary conveyor to said mixing conveyor.

11. In a picking and screening installation, a screening conveyor member, a plurality of decks on said member, said decks terminating in separate discharge portions, a mixing conveyer generally parallel with said screening conveyer, and transverse secondary conveyers associated with the screening conveyer member and adapted to receive material from the discharge portions of the various decks, and to deliver the material so received to the mixing conveyer.

12. In a picking and screening installation, a screening conveyer member, a plurality of decks on said member, said decks terminating in separate discharge portions, a mixing conveyer generally parallel with said screening conveyer, and transverse secondary conveyers associated with the screening conveyer member adapted to receive material from the discharge portions of the various decks and to convey it across said mixing conveyer, and discharge means, associated with said secondary conveyers, adapted to permit the discharge of material therefrom to said mixing conveyer.

13. In a picking and screening installation, a primary reciprocating screening conveyor member, a plurality of transversely disposed secondary endless conveyors associated with said primary conveyor, a plurality of decks on said primary conveyor, said decks terminating in discharge portions overhanging and discharging to said secondary conveyors, an endless mixing conveyor generally parallel with said primary reciprocating conveyor, and discharge means associated with said secondary conveyors, adapted to permit the discharge of material to said mixing conveyor.

14. In a picking and screening installation, a primary reciprocating screening conveyor member, a plurality of transversely disposed secondary endless conveyors associated with said primary conveyor, a plurality of decks on said primary conveyor, said decks terminating in discharge portions overhanging and discharging to said secondary conveyors, an endless mixing conveyor generally parallel with said primary reciprocating conveyor, and discharge means associated with said secondary conveyors, adapted to permit the discharge of material to said mixing conveyor, one of said secondary conveyors being adapted to discharge to the upper reach of said mixing conveyor and another of said secondary conveyors being adapted to discharge to the lower reach thereof.

15. In a picking and screening installation, a primary screening conveyor member, a plurality of transversely disposed secondary endless conveyors associated with said primary conveyor, said secondary conveyors including transverse flights, connecting members joining said flights, and floor members across which said flights are adapted to travel, a plurality of decks on said primary conveyor, said decks terminating in discharge portions overhanging and discharging to said secondary conveyors, a mixing conveyor generally parallel with said screening conveyor, the secondary conveyor floor members being provided with discharge apertures in alignment with said mixing conveyor, and removable gates therefor.

16. In a picking and screening installation, a primary screening conveyor member, a plurality of transversely disposed secondary endless conveyors associated with said primary conveyor, said secondary conveyors including transverse flights, connecting members joining said flights, and floor members across which said flights are adapted to travel, a plurality of decks on said primary conveyor, said decks terminating in discharge portions overhanging and discharging to said secondary conveyors, a mixing conveyor generally parallel with said screening conveyor, the secondary conveyor floor members being provided with discharge apertures in alignment with said mixing conveyor, chutes extending beneath said apertures and adapted to deliver material to said mixing conveyor, and removable gates for said discharge members.

17. In a picking and screening installation, a primary screening conveyor member, a plurality of transversely disposed secondary endless conveyors associated with said primary conveyor, said secondary conveyors including transverse flights, connecting members joining said flights, and floor members across which said flights are adapted to travel, a plurality of decks on said primary conveyor, said decks terminating in discharge portions overhanging and discharging to said secondary conveyors, the floor members of the upper reaches of said secondary conveyors being provided with screening members adapted to deliver material to the lower reaches of said conveyors.

18. In a picking and screening installation, a primary screening conveyor member, a plurality of transversely disposed secondary endless conveyors associated with said primary conveyor, said secondary conveyors including transverse flights, connecting members joining said flights, and floor members across which said flights are adapted to travel, a plurality of decks on said primary conveyor, said decks terminating in discharge portions overhanging and discharging to said secondary conveyors, the floor members of the upper reaches of said secondary conveyors being provided with screening members adapted to deliver material to the lower reaches of said conveyors, and chute or hopper members underlying said screening members and overlying said lower reaches.

19. In a picking and screening installation, a primary screening conveyor member, a plurality of transversely disposed secondary endless conveyors associated with said primary conveyor, said secondary conveyors including transverse flights, connecting members joining said flights, and floor members across which said flights are adapted to travel, a plurality of decks on said primary conveyor, said decks terminating in discharge portions overhanging and discharging to said secondary conveyors, the floor members of the upper reaches of said secondary conveyors being provided with screening members, and chute or hopper members underlying said screening members and overlying the lower reaches of said secondary conveyors, and adapted to deliver the screenings thereto, and a screening conveyor underlying the lower reaches of said secondary conveyors.

20. In a picking and screening installation, a screening conveyor member, a plurality of transversely disposed loading booms associated with said conveyor, a plurality of decks on said conveyor, said decks terminating in discharge portions overhanging and discharging to said loading booms, a mixing conveyor generally parallel with said screening conveyor, discharge means associated with said loading booms and adapted to permit the discharge of material to said mixing conveyor, a discharge hopper underlying said screening conveyor and said mixing conveyor and discharge means associated with said screening and mixing conveyors and adapted to discharge thereto.

21. In a picking and screening installation, a primary reciprocating screening conveyor member, a plurality of transversely disposed secondary endless conveyors associated with said primary conveyor, a plurality of decks on said primary conveyor, said decks terminating in discharge portions overhanging and discharging to said secondary conveyors, an endless mixing conveyor generally parallel with said primary reciprocating conveyor, discharge means associated with said secondary conveyors, adapted to permit the discharge of material to said mixing conveyor, a discharge chute underlying said screening conveyor member and said mixing conveyor and discharge means associated with said screening conveyor and with each reach of the mixing conveyor, adapted to discharge material to such chute.

Signed at Huntington, county of Cabell, and State of W. Va., this 16th day of November 1925.

GEORGE S. JAXON.